Sept. 21, 1965  C. W. SOULES  3,207,507
MAGNETIC SHEET SEPARATOR AND CONVEYOR
Filed July 19, 1963  2 Sheets-Sheet 1
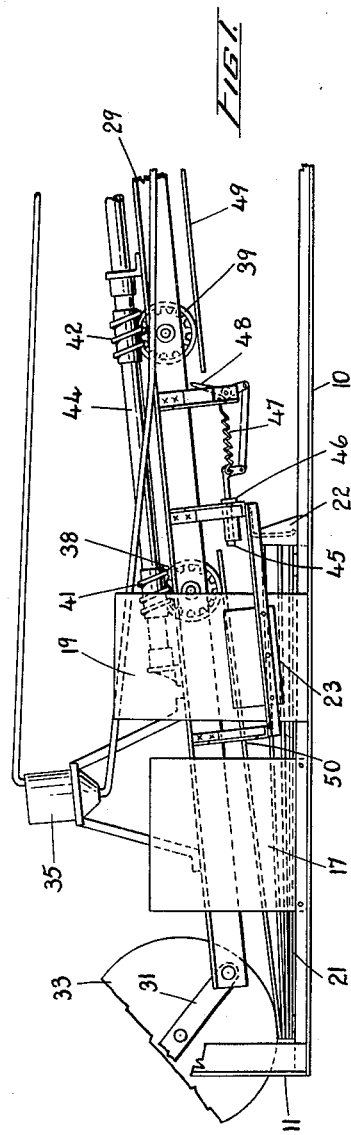
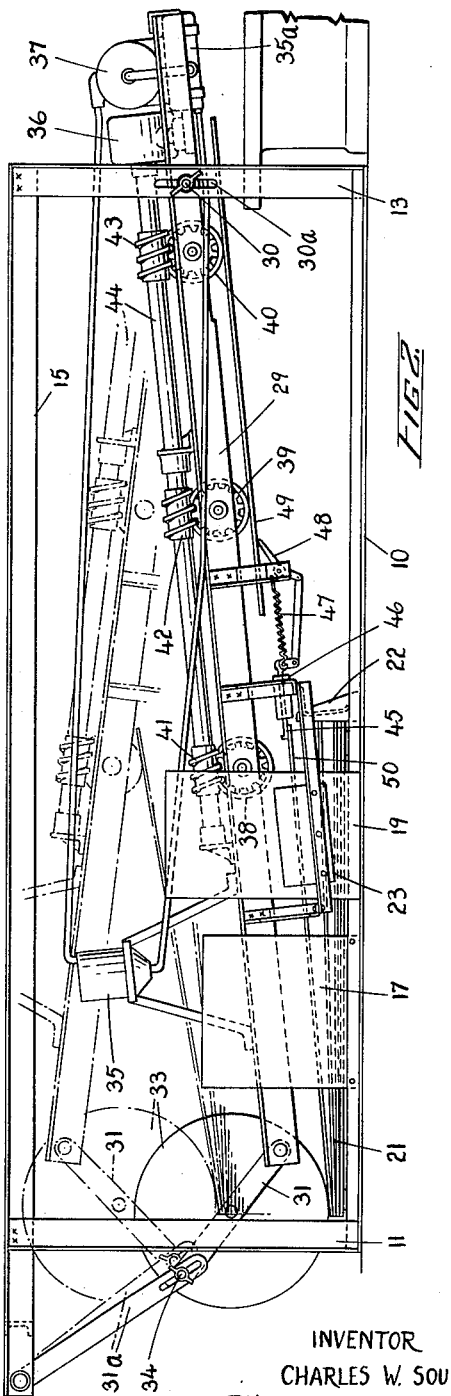
INVENTOR
CHARLES W. SOULES
BY
ATTORNEY Sept. 21, 1965   C. W. SOULES   3,207,507
MAGNETIC SHEET SEPARATOR AND CONVEYOR
Filed July 19, 1963   2 Sheets-Sheet 2
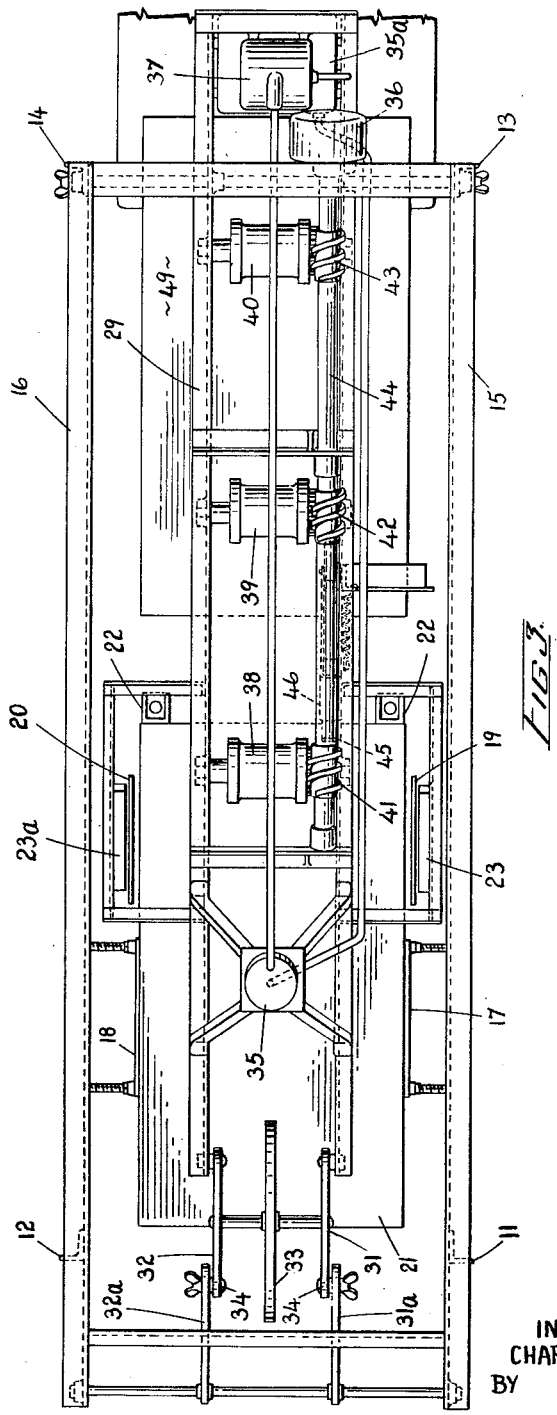
INVENTOR
CHARLES W. SOULES
BY
ATTORNEY United States Patent Office 3,207,507
Patented Sept. 21, 1965

3,207,507
MAGNETIC SHEET SEPARATOR AND CONVEYOR
Charles W. Soules, 37 Kingsdale Ave., Willowdale, Ontario, Canada
Filed July 19, 1963, Ser. No. 296,343
6 Claims. (Cl. 271—18)

This invention relates to a conveying machine or apparatus for transporting steel sheets from their pile in its rear and in particular to a magnetic floater feeding machine which will magnetically lift each sheet one at a time and then magnetically carry such sheet forward to deliver it to a machine for processing such sheet steel, if desired, at a preselected location and position with automatic ease of release at the point of delivery.

It is an object of the present invention to provide a magnetic floater feeding machine for conveying or transporting steel sheets from their pile entirely in an automatic manner without manual manipulation of the sheets and without mechanical means for lifting each sheet or adjusting the height of the magnetic floaters relative to the top level of the pile.

Magnetic devices have heretofore been proposed for transporting steel sheets from their pile to a preselected location or to a processing machine but such machines required mechanical means for elevating the pile as the sheets were removed.

The present invention provides a magnetic floater feeding machine which is entirely automatic, the magnetic floaters automatically adjusting themselves to the correct position relative to the uppermost or top sheets of the pile respective of its height and floating the top sheet into position where it will be magnetically attracted to a series of power driven magnetic feeder pulleys which will transport the steel sheets to the pre-selected location and position. The machine is provided with a device which will ensure that only one sheet at a time is carried by the magnetic feeder pulleys.

The apparatus of the present invention comprises the combination of:

(a) a compartment for containing a pile of steel sheets;
(b) a magnetic sheet spreader having automatic up and down movement relative to the edges of said pile whereby said spreader is automatically positioned adjacent the uppermost sheets of the pile to thereby magnetically spread the sheets and initially elevate the top sheet;
(c) a framework mounted for vertical movement relative to said pile, said framework lying in a plane above said pile,
(d) magnetic feeder pulleys carried by the framework at least one of which magnetically lifts the top sheet into engagement therewith,
(e) a power drive operatively driving said pulleys in a direction to move the sheets one at a time towards the forward end of the framework,
(f) means automatically maintaining the first feeder pulley in the same position relative to the pile to magnetically attract only the elevated uppermost sheet thereagainst, whereby the upper sheets of the pile are separated and elevated therefrom, the top sheet being drawn by magnetic forces against the feeder pulley positioned substantially directly above the pile and transported to the preselected delivery point by the feeder pulleys and as the pile lowers the magnetic sheet spreaders automatically move downwardly until the pile is exhausted, and the feeder pulley is automatically maintained at substantially the same distance from the top sheet irrespective of the height of the pile.

The construction and operation of the magnetic floater feeder machine will now be described with reference to the accompanying drawings which schematically illustrate the same and in which:

FIGURE 1 is a side elevation of a machine constructed in accordance with the present invention with a partial load of steel sheets piled in its rear or left hand end;

FIGURE 2 is a view similar to FIGURE 1, showing in dotted lines a full load of steel sheets with the framework and its related parts shown in dotted lines in its elevated position;

FIGURE 3 is a plan view of the machine shown in FIGURE 1.

The essential mechanism of the machine is supported and suspended from a skeletal framework consisting of a base 10, upright posts 11, 12, 13 and 14, one at each corner of the base and beams 15, 16 supported by the posts 11, 12 and 13, 14 respectively.

At the left hand or rear end of the machine, the base 10 is provided with a compartment in which the steel sheets are piled, the compartment being defined by side walls 17, 18 which are spatially adjustable for different widths of sheets, such adjustment not being shown since that is considered to be within the knowledge of a skilled mechanic without giving details as to how that should be accomplished. The walls, as will be seen from the drawings do not extend to the front of the pile. Preferably the front end of the compartment has a pair of oppositely disposed nonmagnetic upright panels 19, 20 which are substantially parallel with the side walls 17, 18 respectively but spaced apart slightly greater than the spacing between the side walls 17, 18. These panels ensure that the magnets will not bring the edges of the piled steel sheets into contact therewith. However, the present invention is being illustrated with the use of a pair of oppositely disposed magnetic spreaders and consequently only two panels one on each side are shown. A pile of steel sheets 21 is shown as being located in the compartment, the forward end of the sheets engaging against stops 22 to keep the steel sheets from being placed, or advanced, too far forward initially.

Carried by the skeletal frame is a horizontal framework 29 which, in the present construction, has its right hand end pivotally mounted to the posts 13, 14 the pivotal mountings 30 being carried in slots 30a formed in the posts 13, 14 allowing the mounting to have limited vertical adjustability. The framework extends to the rear or substantially to the rear end of the skeletal framework and has its rear end supported by a combination of a pair of spaced apart articulated levers 31, 31a and 32, 32a in spaced apart relationship. The levers 31a and 32a are pivotally connected to the skeletal frame and the other levers 31, 32 are pivotally connected to the rear end or adjacent the rear end of the horizontal framework. The levers 31, 32 carry a wheel or wheels 33 and are positioned to ride on the pile of steel sheets adjacent the end thereof remote from the spreaders 23, 23a. The pivotal point 34 of each of the levers 31, 32 is adjustable to provide a second adjustment for positioning the mid-portion of the frame relative to the forward end of the pile. By this arrangement the wheel riding on the top sheets of the pile will maintain the feeder pulleys which are carried thereon, as hereinafter described, substantially at the same distance from the top sheet as the height of the pile is lowered by removal of the sheets.

The framework 29 may be provided with an automatic counterbalancing system which will lift or assist in lifting the rear of the frame upwardly when the motor hereinafter described is stopped and to lower the rear end of the pivoted frame into position when the motor starts or is running. This counter-balancing system includes an elevated liquid reservoir 35 mounted on the framework above and near the wheel or wheels 33, a pump 37 and a storage tank 35a, having a capacity substantially equal to that of the tank 35. The pump 37 is mounted on the forward end of the framework beyond the pivot 30 and is driven by motor 36 (not shown). When the motor 36 is being driven it will drive the pump 37 to fill the reservoir 35. As soon as the motor stops the liquid in the tank in the reservoir 35 will flow by gravity back into the pump and lift or aid in lifting the rear of the framework upwardly.

In the present machine, there is employed a pair of magnetic spreaders 23, 23a one on each side of the machine. The magnetic spreaders are mounted on the frame so that they are positioned outside the panels 19, 20 and adjacent the uppermost sheets of the pile. The correct position of the spreaders are slightly above the top sheet of the pile to obtain maximum separation. This can be readily ascertained by adjusting the elevation of the spreaders relative to the top of the pile until maximum separation is achieved. The mounting of the frame ensures that the magnetic spreaders 23, 23a will ride up and down with the frame and maintain the spreaders in substanially the same position relative to the uppermost sheets of the pile.

We now come to a description of the system for transporting the sheets from the pile to the preselected point of delivery. In the present machine this consists of power driven magnetic feeder pulleys 38, 39 and 40 carried by the framework 29, the feeder pulley 38 being located directly above the forward end of the pile, the pulley 40 being positioned adjacent the forward end of the framework and the intermediate pulley 39 being positioned between the pulleys 38 and 40, the spacing between the pulleys being such that a sheet being transported by the pulleys as hereinafter described will be constantly in contact with at least two pulleys during the period that the pulleys form the sole support of the sheets. Each of the pulleys are driven by worm gears 41, 42, 43 mounted on a common shaft 44 which common shaft is driven by the motor 36. It will be seen from the drawings that the worm gears 41, 42, 43 mesh with pinions carried on the feeder magnetic pulleys 38, 39 and 40 respectively.

The mechanical means for preventing the overlapping of the ends of two contiguous sheets in process comprises a retractile stop member 45 carried in a sleeve 46 which is suspended from the frame 29 and positioned to maintain the retractile stop member in a position so that when actuated it will extend over the front end of the pile and be positioned thereabove at a point below the feeder pulley 38. The retractile member is biased by a spring 47 which is tensioned by a spring tensioner or actuator 48, the actuator being actuated to tension the spring by a sheet being transported. In FIGURE 2, the reference numeral 49 identifies a sheet being transported by the feeder pulleys 38, 40 and when in that position the actuator 48 pushes against the tension of the spring 47, to project the retractile stop member 45 out over the steel sheet and thus prevents the sheet 50 from jumping up into contact with the feeder pulley 38. When the sheet 49 has cleared the actuator as shown in FIGURE 1, the retractile member 45 is retracted by the spring 47 and allows the sheet 50 to jump up into contact with the feeder pulley 38 and thus feed the sheet 50 to the forward end of the machine and to the preselected point. The embodiment of the invention which has been described is for the purpose of illustrating the same but it is to be understood that this is by way of illustration and not by way of limitation. It will be apparent that modifications and alterations may be made in the structure without departing from the substance of the invention which is defined in the appended claims.

Initially the sheet 50 is prevented from coming into magnetic contact with feeder pulley 38 along with the sheet 49 by the magnetic separation or repelling action between them induced by the magnetic spreaders 23 and 23a. At this stage the stop 45 is not essential since the said sheet 50 will be repelled away from the sheet 49 by the magnetic spreaders.

When the sheet 49 is processed far enough forward to expose part of feeder pulley 38, the repelling action of the spreaders 23, 23a on the sheets 49, 50 is reduced and the magnetic attraction of the feeder pulley is sufficiently strong to attract sheet 50, causing it to jump up too quickly into magnetic contact with pulley 38 and overlap sheet 49 before it had cleared pulley 38. The stop 45 ensures that the sheet 50 will not come into magnetic contact with the pulley 38 until after the rear end of the preceding sheet has cleared that pulley.

The magnetic forces of the feeder pulley and the spreaders are coordinated so that only the top sheet will be picked up and the sheets below will be repelled.

The invention will now be described with reference to the embodiment illustrated in the drawings.

When the machine is shut down as previously explained the automatic counterbalance pivots the frame 29 on its pivots to swing the left hand end thereof upwardly thus permitting the loading of steel sheets into the compartment. By starting the motor 36 it will drive the feeder pulleys 38, 39 and 40 and also operate the pump to transfer liquid from the storage tank 35a to fill the reservoir 35. Thereupon the weight in the reservoir 35 will cause the framework to pivot until the wheel 33 rests on the top sheet of the pile, at the same time, bringing the spreaders 23, 23a into the proper position to effect a magnetic separation of the uppermost sheets of the pile and the pulley 38 will attract the top sheet to it, and as it is now rotating, will start feeding the sheet through the machines.

The sheet 49 is shown as being fed through the machine and as it is in engagement with the actuator 48, the retractile stop member has been projected to extend outwardly over the sheet 50 and prevent it from jumping into contact with the pulley 38. As soon as the sheet 49 clears the actuator 48 and the spring 47 has retracted stop member 45, the sheet 50 can then jump up and come in contact with the feeder pulley 38.

Each spreader 23, 23a is kept from actual contact with the pile of steel sheets by the non-magnetic panel structure, 19, 20 fastened to the frame 29 which panels separate the spreaders from the pile. The sheets cannot touch the panels of the restriction because of the sidewalls 17 and 18.

The spreaders are maintained level with or slightly above the top of the steel pile, where it is most effective in inducing magnetism into the top sheets. This induced magnetism causes the separation of the forward ends of the first few sheets to permit and assist, in the removal of a single sheet, viz, the topmost one. As the top level of the steel pile is reduced by the one-by-one removal of its top-sheet, the spreaders will descend.

This separation or "floating" of the forward ends of the top-sheets of the steel pile initiates and advances the upward movement of the top-sheet toward magnetic contact with the feeder pulley 38. The magnetic attraction of the top-sheet to the feeder pulley 38 is the extra force necessary to cause the front end of the sheet to move up into magnetic contact therewith. The magnetism induced by the spreaders into the top sheets of the pile repelling them apart, keeps two or more sheets from rising, at the same time, into magnetic contact with feeder pulley 38.

When the front edge of the steel sheet makes contact with the feeder pulley 38, it is passed forward by the motor driven feeder pulley 38 until it contacts motor driven feeder pulley 39 and thence similarly carried forward to motor driven pulley 40 and if necessary, to other motor driven magnetic feeder pulleys until it reaches its required destination. In the present embodiment, at least two feeder pulleys are constantly in contact with each steel sheet during the period that the feeder pulleys serve the sole support of the sheet as clearly illustrated in FIG- URES 1 and 2 to prevent tilting of the steel sheet. However, it will be apparent that the number of feeder pulleys is dependent on the proximity of the destination of the sheet.

When the first sheet advances until only its back edge is in contact with the feeder pulley 38 just a slight amount of magnetism is absorbed by this edge from pulley 38 to retard its forward progress, and it is readily pulled away from pulley 38 by the much greater combined attraction of the two magnetic pulleys 39, 40 in contact with its body surface not just an edge.

Similarly, the mechanism into which each steel sheet is fed, at the end of its journey through the machine, can readily pull it away from the magnetic attraction of the last feeder pulley on the rear edge of the sheet or the weight of the sheet itself will pull it away from the edge, the only contact with the last feeder pulley, and the sheet will fall into a hopper or chute.

If the mechanism into which each steel sheet is fed demands a momentary pause in the forward transportation of the steel sheet (such as a stamping or shearing operation) the feeder pulleys contacting the sheet at the time will harmlessly rotate against the sheet while still holding it magnetically.

After sheet No. 1 jumps up into magnetic contact with feeder pulley 38, and while it is being rolled forward by feeder pulleys 38 and 39, sheet No. 2 cannot also jump up into magnetic contact with feeder pulley 38. This is partly because the spreaders are still inducing magnetism into sheets numbered 1 and 2, repelling them apart, and partly because most of the magnetism of pulley 38 is being consumed into sheet No. 1 and only a small amount of its power can penetrate through to attract sheet No. 2. There is also the further restraining force of the retractile stop member 45 mentioned above until the rear end of the first sheet 49 has been entirely cleared from pulley 38, after which the magnetism of that pulley becomes fully available to attract sheet 50 and this will be accomplished as soon as the retractile member 45 is drawn into the sleeve 46 by spring 47 when the rear end of the first sheet has released the actuator 48. This sequence is repeated and the steel sheets are processed one at a time from the top of the pile to the bottom.

As previously explained the first pulley 38 is maintained in its correct relationship to the top of the pile by the wheel or wheels 33 which is carried on the articulated lever 31, the wheel riding on the uppermost sheet and thus as the sheets are removed the wheel will always automatically drop downwardly the thickness of each sheet as each sheet is removed. As soon as the last sheet is removed the motor is stopped which simultaneously stops the pump 36. The fluid in the elevated reservoir 35 will flow back by gravity into the tank 35a and the additional weight will then counterbalance and lift the rear end (left hand end) of the frame 29 upwardly to allow a fresh pile of sheets to be placed in the compartment.

The side walls 17, 18 one on each side of the rear area of the machine, keep the steel sheets in alignment to directionally guide the initial transportation of each sheet. The side walls, by containing the steel sheets, also prevent their contact with the non-magnetic channel structure, on either side of the rear area, with resultant frictional resistance. The steel sheets are thus free to spread vertically and lift or tilt or bend into contact with the magnetic feeder pulley 38.

If jamming occurs, or were to occur, the magnetic feeder pulleys 38, 39 and 40 would overcome the frictional resistance of their magnetic attraction to the steel sheet in progress therethrough and merely turn on the face of the sheet with no harmful results.

For extra heavy or wide sheets, additional magnetic spreaders similarly held beyond the non-magnetic panel structures may be made available at each of the sides of the machine and also along in front of the rear area.

In some cases it might be desirable, for some reason, to not only float and raise the front end of the sheet, but the whole of the sheet from the pile into magnetic contact with feeder pulleys. This may be accomplished by employing additional spreaders in spaced apart relationship along each side of the pile and along the front and rear if necessary. This might require the addition of a retractile stop member at each end of the pile and not just over the forward end as shown in the drawings.

The machine of the present invention features coordination, synchronization, readily adjustable components, automatic performance with built-in controls and an extremely high degree of safety, in the separate movement of all magnetically controlled materials in sheets and other forms and is modifiable and adaptable for many situations and requirements. The magnetic feeding of the sheets to the feeder pulleys is entirely automatic and entirely magnetic in which the pile of steel sheets remain stationary and the spreaders automatically adjust themselves as the height of the pile lowers and the transporting feeder pulleys automatically adjust themselves relative to the height of the pile.

What I claim as new and desire to protect by Letters Patent of the United States is:

1. In a conveying apparatus for transporting steel sheets piled in its rear end and deliver the sheets one at a time at its front end of combination of:
   (a) a supporting structure having a stationary compartment for containing a pile of steel sheets;
   (b) a framework pivotally connected at one end to the structure for free up and down movement relative to said pile, said framework lying in a plane above said pile;
   (c) a magnetic sheet spreader carried by the framework having automatic up and down movement relative to the edges of said pile whereby said spreader is automatically maintained in a position adjacent the uppermost sheets of the pile to thereby magnetically spread the sheets and initially elevate the top sheet;
   (d) rotatable magnetic feeder pulleys carried by the framework, at least one of which is positioned directly above the pile and magnetically lifts the top sheet into engagement therewith,
   (e) a power drive operatively driving said pulleys in a direction to move the sheets one at a time towards the forward end of the framework,
   (f) mechanical means automatically actuated by the pile level to maintain the magnetic sheet spreader and the first feeder pulley at all times in the same position relative to the pile to magnetically spread and attract only the elevated uppermost sheet thereagainst, whereby the upper sheets of the pile, are, one at a time, separated and elevated therefrom, the top sheet being actuated by magnetic forces into contact with the feeder pulley positioned substantially directly above the pile and transported to the preselected delivery point by the feeder pulleys and as the pile lowers the magnetic sheet spreaders automatically move downwardly until the pile is exhausted, and the feeder pulley is automatically maintained at substantially the same distance from the top sheet irrespective of the height of the pile.

2. In a conveying apparatus according to claim 1, the additional element of a releasable stop member normally restraining a second sheet jumping into magnetic contact with the first pulley while the top sheet is in contact therewith thereby ensuring that the sheets are transported one at a time by the feeder pulleys, said stop member comprising a spring biased retractile member movable to project over the front end of the piled sheets, and an actuating member operatively connected to the spring, said actuating member lying in the path of travel of and engageable by a sheet being transported by the pulleys to actuate the retractile member to project over the front end of the piled sheets.

3. In a conveying apparatus according to claim 1, wherein the means for automatically maintaining the magnetic sheet spreaders and the first feeder pulley in position to magnetically spread and attract the top sheet thereagainst comprises a support wheel adjacent the free end of the framework and a lever system operatively connecting the wheel to the framework and the supporting structure comprising an articulated lever operatively connected to the free end of said framework and to the said structure, one arm of said lever being pivotally connected to the support wheel on the axis of rotation of the wheel to provide a support for the wheel, said support wheel riding on the top sheet of the pile to support the free end of the framework and maintain the first pulley and the spreaders constantly at the same relative distance from the top sheet as the height of the pile is lowered by removal of sheets.

4. In a conveying apparatus for transporting steel sheets piled in its rear end and deliver the sheets one at a time at its front end the combination of:
 (a) a supporting structure having a stationary compartment at the rear of the apparatus for containing a pile of steel sheets;
 (b) a pair of oppositely disposed stationary upright panels of non-magnetic material adjacent the forward end of the compartment for receiving therebetween the front ends of the steel sheets with clearance between the edges of the sheets and the panels;
 (c) a framework pivotally connected at one end to the structure for free up and down pivotal movement relative to said pile, said framework lying in a plane above said pile;
 (d) magnetic sheet spreaders mounted on and moving with said framework, said spreaders being positioned on each side of the frameworks and adjacent the exterior of each panel, and in alignment with the uppermost sheets of the pile to magnetically spread the uppermost sheets and initially elevate the top sheet;
 (e) rotatable magnetic feeder pulleys carried by the framework and positioned to magnetically attract the elevated uppermost sheet into engagement with the first of said pulleys positioned directly above the pile,
 (f) a power drive operatively driving said pulleys in a direction to transport sheets towards the forward end of the framework,
 (g) mechanical means automatically actuated by the pile level to maintain the magnetic sheet spreaders and the first feeder pulley in a constant spaced relation to the pile to magnetically attract the elevated uppermost sheet thereagainst until the pile of sheets is exhausted,
whereby the upper sheet of the pile is separated and elevated therefrom, the top sheet being drawn by magnetic forces against the feeder pulley positioned substantially directly above the pile and transported to the preselected delivery point by the feeder pulleys and as the pile lowers the magnetic sheet spreaders automatically move downwardly until the pile is exahusted, and the first feeder pulley is automatically maintained at substantially the same distance from the top sheet irrespective of the height of the pile.

5. In a conveying apparatus according to claim 4, the additional element of a releasable stop member normally restraining a second sheet jumping into magnetic contact with the first pulley while the top sheet is in contact therewith thereby ensuring that the sheets are transported, one at a time, by the feeder pulleys, said stop member comprising a spring biased retractile member movable to project over the front end of the sheets, and an actuating member operatively engaging the spring, said actuating member lying in the path of travel of and engageable by a sheet being transported by the pulleys to actuate the retractile member to project over the front end of the piled sheets.

6. In a conveying apparatus according to claim 5, wherein the means for automatically maintaining the magnetic sheet spreaders and the first feeder pulley in position to magnetically spread and attract the top sheet thereagainst comprises a support wheel adjacent the free end of the framework and a lever system operatively connecting the wheel to the framework and the supporting structure comprising an articulated lever operatively connected to the free end of said framework and to the said structure, one arm of said lever being pivotally connected to the support wheel on the axis of rotation of that wheel to provide a support therefor said support wheel riding on the top sheet of the pile to support the free end of the framework and maintain the first pulley and the magnetic sheet spreaders constantly at the same relative distance from the top sheet as the height of the pile is lowered by removal of sheets.

References Cited by the Examiner

UNITED STATES PATENTS

| 1,870,314 | 8/32 | Lincoln | 271—18.1 |
| 2,015,809 | 10/35 | Moore | 271—18 |
| 2,973,959 | 3/61 | Stolk | 271—18 |
| 2,996,297 | 8/61 | Buccicone | 271—18.1 X |
| 3,071,371 | 1/63 | Wickland | 271—26 |

ROBERT B. REEVES, *Acting Primary Examiner.*